United States Patent Office 2,818,444
Patented Dec. 31, 1957

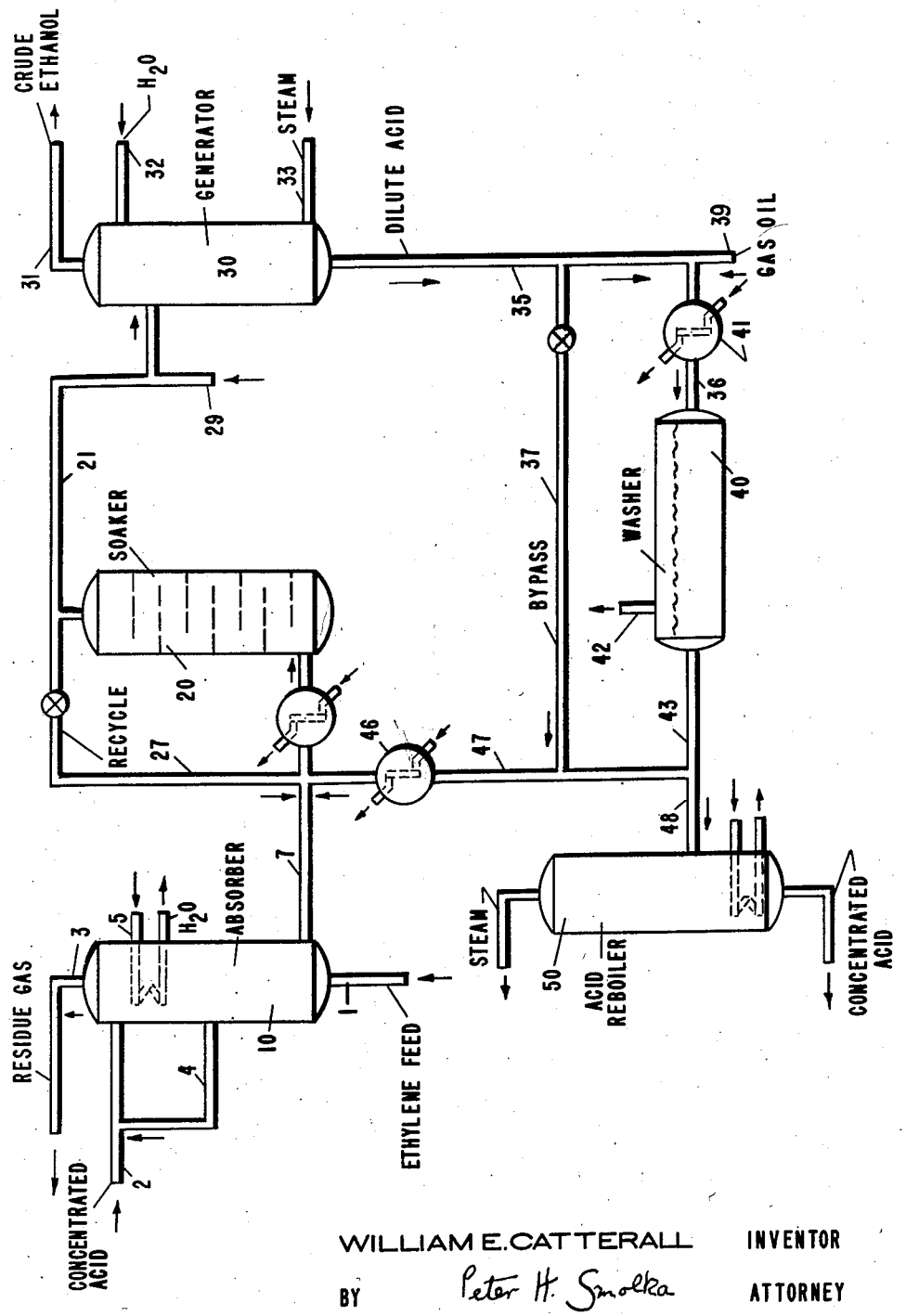

2,818,444

HYDROLYSIS OF ETHYL SULFATE

William E. Catterall, Roselle, N. J., assignor to Esso Research and Engineering Company, a corporation of Delaware Application February 24, 1954, Serial No. 412,285

10 Claims. (Cl. 260—639)

This invention relates to an improvement in the strong sulphuric acid process for manufacturing ethanol from ethylene. More specifically, it relates to a novel process for hydrolyzing the ethyl sulfate extract at relatively high acid strengths, so as to avoid the corrosive range of acid strength in the process and to minimize the amount of water to be evaporated from the acid in restoring its original strength.

The manufacture of ethanol from ethylene is a well-known commercial operation. In such a process a purified ethylene-containing feed, such as an ethylene-bearing $C_2$ and lighter cut obtained by steam cracking of gas oil or by other thermal or catalytic cracking of suitable hydrocarbon streams, is absorbed in or extracted with concentrated sulfuric acid, that is, with 90 to 100% sulfuric acid. The resulting ethyl sulfate extract is then normally diluted to about 50% acid strength to hydrolyze the mixture and release the ethanol without excessive ether formation. Such ether formation is desirably held at levels of about 15% on alcohol, or less. However, as a result of the great dilution of the acid in the hydrolysis step, the acid becomes highly corrosive to carbon steel or the various nickel alloys and large amounts of water must be removed from the spent acid to make it suitable for recycling to the ethylene absorber.

It is an object of this invention to minimize the corrosion of metal equipment in the manufacture of ethanol. Another object is to minimize the amount of water to be removed in regenerating the spent acid. A more specific object is to produce ethanol from relatively concentrated sulfuric acid extracts without exceeding the permissible levels of by-product ether formation. These and other objects, as well as the general nature and specific embodiments of the invention will become more clearly apparent from the subsequent description, particularly when read with reference to the accompanying drawing. In the description it will be understood that all ratios and percentages are expressed on a weight basis, and acid strengths on a hydrocarbon-free basis, unless some other basis is indicated or apparent.

The drawing represents a schematic diagram of a process embodying the present invention.

It has now been discovered that excessive ether formation can be avoided even when the hydrolysis of the ethyl sulfate extract is done at relatively high acid strengths, provided that diethyl sulfate can be substantially eliminated from the hydrolysis step. More specifically, it has been discovered that this can be accomplished by hydrolyzing the extract only after reducing the extract saturation, that is, the mol ratio of absorbed ethylene to acid from the usual level of about 1 to 1.5 in the original extract down to about 0.3 to 0.5. Still more specifically it has been discovered that this reduction in extract saturation can be advantageously obtained by diluting and equilibrating the concentrated acid extract with spent dilute acid in a preliminary hydrolysis step and by completing the hydrolysis of the diluted extract in a following stage at an acid strength of about 60 to 75%, preferably 65 to 70%.

This final hydrolysis may be accomplished by adding water to the partially hydrolyzed extract, thereby producing ethanol and spent dilute acid. The ethanol may be removed from the product by steam stripping or other means directly in the final hydrolysis step. In fact at these acid strengths hydrolysis of ethyl hydrogen sulfate, i. e. ethyl monosulfate, will not proceed to completion without removal of ethanol, because of equilibrium considerations. In any event the stripped dilute acid is preferably divided into two streams, one being recycled to reduce the extract saturation of the original extract, and the other being reconcentrated to the full strength such as 90 to 100%, preferably about 96 to 99%, for recycling to the ethylene absorber.

Referring to the drawing, an operation of a process according to the present invention will now be described more specifically.

An ethylene-bearing gas stream 1 is extracted in an absorption tower 10 by countercurrent contact with 98% sulfuric acid introduced through line 2. The extraction may be carried out at a temperature of about 60 to 100° C., e. g. 80° C., and at a pressure of about 100 to 500 p. s. i. g., e. g. 300 p. s. i. g. Heat of absorption may be removed from the absorption tower in any convenient manner, e. g. with the aid of one or more internal coils 5 through which a coolant such as water may be circulated. The ethylene-bearing feed, which may be obtained from a steam cracking operation, will normally contain about 40 to 70 mol percent, e. g. 65% of ethylene, the remainder consisting essentially of methane and ethane. The unabsorbed gas is withdrawn from absorber 10 through line 3, and may be used as fuel. The mol ratio of concentrated acid (as 100% $H_2SO_4$) in line 2 to ethylene feed (as 100% $C_2H_4$) in line 1 may range between about 0.6 and 0.9 to 1. Furthermore, it is desirable to recycle some of the acid extract from absorber 10 through line 4, e. g. at an extract saturation of about 0.8. The ratio of such recycle acid to fresh acid is preferably such as to produce a feed acid mixture having a saturation of about 0.5. Such a mixture is much superior to straight sulfuric acid as an absorbent for ethylene.

Typically, the resulting ethyl sulfate extract may contain about 45.5% of diethyl sulfate, 38% ethyl hydrogen sulfate and 16.5% free sulfuric acid. This extract is removed from the absorption tower 10 through line 7 at an extract saturation of about 1.2 to 1.5, e. g. 1.4 and diluted with spent acid of about 60 to 75% acid strength, e. g. 68% acid, so as to reduce the saturation of the extract to about 0.3 to 0.5, e. g. 0.4. Accordingly, about 250 to 700 parts by weight of the dilute acid may be added through line 47 per 100 parts of the concentrated acid present in the extract. This may reduce the acid concentration of the resulting mixture to about 70 to 80% on an ethylene-free basis, preferably to about 74.5%. This mixture is then brought to equilibrium by soaking it in drum 20 at a temperature of about 70 to 120° C. for a suitable period of time. For instance, soaking for about three hours is sufficient at 100° C. and correspondingly longer times at lower temperatures. After reaching equilibrium, the mixture will contain essentially no diethyl sulfate. Sometimes the diethyl sulfate may tend to form a separate phase when the strong extract is diluted with the dilute acid, before the diethyl sulfate becomes decomposed, and this may lead to excessive tar formation. To avoid such undesirable phase separation, it may be desirable to recycle through line 27 soaker effluent in a ratio of about 3 to 4 mols of sulfuric acid (ethylene-free basis) per mol of acid in stream 7, so as to dilute the diethyl sulfate in the soaker feed still further. Such recycling of course has no net effect on extract saturation in the soaker.

The soaker product is then fed to the generator tower 30 through line 21. Stripping steam is also introduced through line 33, and additional water in liquid phase may be fed to tower 30 through line 32 for simultaneous hydrolysis of the monoethyl sulfate and stripping of the alcohol product within this tower. Simultaneous hydrolysis and stripping is particularly desirable since it allows the hydrolysis to proceed to substantial completion. The relatively strong acid tends to catalyze the hydrolysis of the monoethyl sulfate and consequently the reaction rate here will be quite high. When it is desired to produce 68% acid at atmospheric pressure in generator 30, the hydrolysis and stripping may thus be carried out at a temperature of about 160° C.

If the generator can be operated under vacuum, correspondingly lower temperatures may be employed with advantage, e. g. about 105° C. at a pressure of 100 mm. Hg. Keeping the temperature as low as practical, preferably below about 110° C., has the advantage of repressing ether formation and ethylene regeneration in generator 30. The hydrolysis in generator 30 will normally be completed in five minutes or less, e. g. in 0.5 to 2 minutes. In any case enough water in liquid form or as steam is added to tower 30 to dilute the acid to the desired 60 to 75% strength, preferably 65 to 70% strength, e. g. to 68%.

Accordingly, depending on the strength of the acid in the soaker effluent, and depending on the desired degree of dilution and the amount of water lost by evaporation in tower 30 and elsewhere, about 1 to 3 moles, e. g. 1.5 moles of water is fed into generator tower 30 per mole of $H_2SO_4$ in the soaker effluent stream 21. Of course, instead of supplying the water of hydrolysis directly into the generator, it is also possible to operate the latter simply with a stripping gas without adding extraneous water therein, in which case the required amount of water may be introduced at any other convenient point subsequent to the soaker, e. g. through line 29 into the soaker effluent stream 21. Normally, however, at least a portion of this water is advantageously injected into tower 30 through line 33 in the form of steam so as to provide a stripping agent. The amount of such stripping steam is dictated primarily by the heat balance, enough steam being added to strip out essentially all of the ethanol and to raise the acid to its boiling point. The stripped out crude alcohol vapors which may contain about 50 mole percent of water are finally withdrawn from tower 30 through line 31 and recovered in a conventional manner. For instance, the vapors may be scrubbed with caustic soda, condensed, passed through a first distillation column to remove ether therefrom, and finally rectified in an alcohol column.

The stripped dilute acid is withdrawn from generator tower 30 through line 35 and divided into two streams. Stream 47 is recycled to dilute the original extract stream to the required extent while the remainder is sent through line 48 to acid reboiler 50 where the acid is reconcentrated to its original strength for further use in the absorber 10. Depending on the extent of dilution to be accomplished in the pre-hydrolysis or soaker stage 20, the volume of stream 47 may be about 1.5 to 4 times bigger than stream 48. Furthermore, either part or all of the stripped dilute acid can be washed with an inert, acid immiscible flotation agent to float carbonaceous contaminants from the acid into the oil layer. Suitable wash liquids include gas oil, pine oil, kerosene and mixtures thereof.

For instance, all of the stripped acid withdrawn from generator 30 may be mixed with gas oil introduced through line 39 in a ratio of about 2 volumes of gas oil per 100 volumes of acid. For maximum effect it is desirable to cool the acid to about 40° C. or less by passage through water cooler 41 before it is passed through line 36 into washer 40. The resulting mixture may then be allowed to settle in washer 40. In this manner the carbonaceous sludge will float into the gas oil layer which will be withdrawn through line 42. Scrubbed acid may then be withdrawn as the bottom layer through line 43, to be split into aforementioned streams 47 and 48. Such washing of all of the acid results in an especially clean operation. In particular, the generator tower 30 can thus be kept free of deposits which otherwise may become troublesome. However, frequently it is sufficient to scrub only a minor portion, e. g. about 5 to 40%, of the stripped acid and to by-pass the remainder from line 35 through line 37 directly to line 47 for recycling to soaker 20. Where a major proportion of the acid is by-passed through line 37, it may be advantageous to pass it through a cooler 46 to bring it more nearly to the desired soaker temperature.

Compared with the conventional process wherein all of the acid is diluted with water to about 50% strength, the process of the invention requires only about one half the amount of water, and the amount of water to be evaporated in the acid regenerator is reduced to the same extent. Furthermore, acid strengths of at least about 65% are used throughout the process and consequently corrosion of equipment is very much less than with the more dilute acid found in the conventional process.

The great advantage of reduced acid dilution taught by the present invention may be achieved in existing plants by substituting the pre-hydrolysis acid soaking drum for the conventional hydrolysis vessel or vessels. As compared with the conventional system, the circulation of the stripped dilute acid from the stripper to the soaker in accordance with the present invention requires only additional heating in the hydrolysis stage and cooling in the acid recycle stream to handle the sensible heat load. This heating is conveniently done with direct steam in generator 30 and no extra process equipment is needed, with the exception of one or two coolers. On the other hand, the atmospheric reboilers used in the conventional system for concentrating spent generator acid from say 50% to 68% strength can be eliminated completely when operating according to the present invention, provided that the alcohol generator is not dependent for its supply of stripping steam on the atmospheric reboiler. This elimination of the atmospheric reboilers represents a major advantage since the former give cause to frequent difficulties because of the very corrosive nature of the hot dilute acid normally being treated therein.

The advantages of the invention, particularly with respect to the critical importance of keeping the extract saturation, that is, moles $C_2H_4$/moles $H_2SO_4$, below about 0.5 is further illustrated in the following example:

EXAMPLE

An ethylene extract containing 1.4 mols of ethylene per mol of 98% sulfuric acid (acid strength on ethylene-free basis) was obtained in an ethylene absorber and diluted with 68% sulfuric acid to reduce the extract saturation to the various values shown in Table I. Each of the diluted extracts was then brought to equilibrium by soaking in a soaker for three hours at 100° C., whereupon samples thereof were analyzed to determine the distribution of ethylene among the various constituents.

Table I.—Effect of extract saturation on ether formation

| Extract saturation, mols $C_2H_4$/mols $H_2SO_4$ | Mol percent $C_2H_4$ distribution | | | |
|---|---|---|---|---|
| | Alcohol | Ether | Monosulfate | Disulfate |
| 0.2 | 57 | 7 | 36 | 0 |
| 0.5 | 49 | 15 | 36 | 0 |
| 0.8 | 44 | 23 | 33 | 0 |
| 1.3 | 36 | 33 | 31 | 0 |

It will be noted that in all cases the soaker product was free of diethyl sulfate. However, with increasing extract saturations the soaker product contained increasing amounts of unwanted ether, reaching the approximate economic limit of 15% when the extract saturation reached about 0.5. Furthermore, at low extract saturations this ether formation remains substantially unaffected when the remaining ethyl hydrogen sulfate or "monosulfate" is further hydrolyzed by diluting the extracts with additional water to a final acid strength of 68% (ethylene-free basis). On the other hand, at the higher saturation values additional ether may actually be formed in this subsequent hydrolysis of the monosulfate, thus increasing the total amount of ether still further. In fact, even with the lower saturation values some slight ether formation can take place in the hydrolysis of the monosulfate. Consequently, where ether formation is to be minimized as much as practical, it is preferred to reduce the extract saturation to not more than 0.4 mol of ethylene per mol of sulfuric acid prior to hydrolysis.

The foregoing specification will serve to indicate the general nature of the invention and a specific embodiment has been described to indicate a convenient manner of carrying the invention into practice. However, it will be understood that other variations and modifications of the invention can be made without departing from the scope or spirit hereof. The scope of the desired patent protection is particularly pointed out in the appended claims.

The claims:

1. In a process for converting an ethylene-containing sulfuric acid extract into ethanol, said extract containing about 1 to 1.5 moles of ethylene per mole of sulfuric acid of about 90 to 100% strength, the improvement which comprises mixing said extract with dilute sulfuric acid of about 60 to 75% strength to reduce the extract saturation of the resulting mixture to a value of about 0.3 to 0.5 mole of ethylene per mole of sulfuric acid, passing the resulting diluted extract through a soaking zone, soaking the diluted extract until any diethyl sulfate is substantially completely converted to ethanol, ether and ethyl hydrogen sulfate, adding water to the soaked extract, heating the water-diluted extract in a generation zone to remove aqueous ethanol vapors therefrom, recovering said ethanol vapors, and recovering dilute sulfuric acid of about 60 to 75% strength from said generation zone for recycling to said soaking zone, the amount of said water added to said soaked extract being sufficient to maintain said 60 to 75% acid strength in said generation zone.

2. A process according to claim 1 wherein the concentration of the acid in the diluted extract is between about 70 and 80% on an ethylene-free basis.

3. A process according to claim 1 wherein the said dilute sulfuric acid is of about 68% strength.

4. A process according to claim 3 wherein a portion of the soaking zone effluent is recycled and mixed with the said diluted extract in a ratio of about 3 to 4 moles of recycled sulfuric acid (ethylene-free basis) per mole of sulfuric acid present in said diluted extract.

5. A process according to claim 1 wherein the water is added at least in part in the form of stripping steam which is introduced into said generation zone.

6. A process according to claim 1 wherein essentially all water required for hydrolysis of the ethyl hydrogen sulfate is added to the soaking zone effluent and no extraneous liquid water is added directly to the generation zone.

7. In a process wherein an ethylene-bearing gas is extracted in an absorption zone with sulfuric acid of about 96 to 99% strength to produce a rich extract having an extract saturation of about 1.2 to 1.5 moles of ethylene per mole of sulfuric acid, and the extract is converted into ethanol by hydrolysis, the improvement which comprises mixing the said rich extract with 65 to 70% sulfuric acid in an amount sufficient to produce a diluted extract having an extract saturation of 0.3 to 0.4 and an acid strength of 70 to 80% on an ethylene-free basis, holding the diluted extract at about 70 to 120° C. in a soaking zone until it becomes substantially free of diethyl sulfate, mixing the soaking zone effluent with water in a hydrolytic stripping zone at a temperature between about 80 and 170° C. and a pressure of about 0.1 to 2 atmospheres to reduce the strength of the acid therein to about 65 to 70%, passing a stripping gas through the resulting mixture in said stripping zone, recovering crude alcohol vapors from said stripping zone, also withdrawing stripped acid of about 65 to 70% strength from said stripping zone, recycling the required portion of said withdrawn acid to the soaking zone for diluting said rich extract to the specified saturation, and reconcentrating the remainder of the said withdrawn acid to original strength for recycling to the absorption zone.

8. A process according to claim 7 wherein at least a minor portion of said acid withdrawn from said stripping zone is washed with an inert acid immiscible liquid prior to recycling to the soaking zone.

9. A process according to claim 7 wherein the stripping zone is operated under reduced pressure at a temperature below 110° C.

10. A process according to claim 7 wherein the stripping gas is steam and is supplied to the stripping zone in a sufficient amount to strip out essentially all of the alcohol and to raise the acid in the stripping zone to its boiling point.

References Cited in the file of this patent

UNITED STATES PATENTS

| | | |
|---|---|---|
| 2,067,616 | Moravec | Jan. 12, 1937 |
| 2,474,568 | Bannon et al. | June 28, 1949 |
| 2,512,327 | Hawes et al. | June 20, 1950 |
| 2,529,553 | Hunter | Nov. 14, 1950 |
| 2,609,400 | Amick | Sept. 2, 1952 |
| 2,629,747 | Fuqua | Feb. 24, 1953 |

OTHER REFERENCES

Schrage et al.: Ind. and Engineering Chem., vol. 42, No. 12 (1950) pp. 2550 to 2553.